United States Patent
Hazel et al.

(10) Patent No.: US 12,529,316 B2
(45) Date of Patent: Jan. 20, 2026

(54) BONDING METHOD FOR REPAIR OF SUPERALLOY ARTICLE

(71) Applicant: RTX Corporation, Farmington, CT (US)

(72) Inventors: Brian T. Hazel, Avon, CT (US); John R. Farris, Lebanon, CT (US); Matthew A. Devore, Rocky Hill, CT (US); John A. Sharon, West Hartford, CT (US); James F. Wiedenhoefer, Windsor, CT (US); Paul M. Lutjen, Kennebunkport, ME (US); Mario P. Bochiechio, Vernon, CT (US)

(73) Assignee: RTX CORPORATION, Farmington, CT (US)

( * ) Notice: Subject to any disclaimer, the term of this patent is extended or adjusted under 35 U.S.C. 154(b) by 228 days.

(21) Appl. No.: 17/842,926

(22) Filed: Jun. 17, 2022

(65) Prior Publication Data

US 2023/0151736 A1 May 18, 2023

Related U.S. Application Data

(60) Provisional application No. 63/232,963, filed on Aug. 13, 2021, provisional application No. 63/212,325, filed on Jun. 18, 2021.

(51) Int. Cl.
*F01D 5/00* (2006.01)
*B22F 3/105* (2006.01)
*B22F 3/24* (2006.01)

(52) U.S. Cl.
CPC .............. *F01D 5/005* (2013.01); *B22F 3/105* (2013.01); *B22F 3/24* (2013.01);
(Continued)

(58) Field of Classification Search
CPC .......... F01D 5/005; B23P 6/005; B23P 15/04; B23K 2101/001; B23K 1/0018;
(Continued)

(56) References Cited

U.S. PATENT DOCUMENTS 3,394,918 A 7/1968 Wiseman
5,264,011 A 11/1993 Brown et al.
(Continued)

FOREIGN PATENT DOCUMENTS

DE 102014206827 A1 10/2015
EP 0309627 B1 6/1993
(Continued)

OTHER PUBLICATIONS

Lin et al. "Sintering and joining of Ni-based superalloys via FAST for turbine disc applications" Metallurgical and Materials Transactions A, vol. 51 No. 3, pp. 1353-1366 (Mar. 2020).
(Continued)

*Primary Examiner* — Jason L Vaughan
(74) *Attorney, Agent, or Firm* — CANTOR COLBURN LLP

(57) ABSTRACT

A method of repair of a part is provided and includes removing a section that is damaged from the part, casting a replacement section for the part, the replacement section having a geometry similar to that of the section in an undamaged condition and bonding the replacement section to the part using field assisted sintering technology (FAST).

12 Claims, 5 Drawing Sheets

(52) U.S. Cl.
CPC ... *B22F 2003/242* (2013.01); *B22F 2003/247* (2013.01); *F05D 2230/80* (2013.01)

(58) Field of Classification Search
CPC ......... Y10T 29/49318; Y10T 29/49238; Y10T 29/4932; Y10T 29/49336
See application file for complete search history.

(56) References Cited

U.S. PATENT DOCUMENTS

| | | |
|---|---|---|
| 5,395,699 A | 3/1995 | Ernst et al. |
| 5,636,439 A | 6/1997 | Cunha et al. |
| 6,131,800 A | 10/2000 | Fernihough et al. |
| 6,217,282 B1 | 4/2001 | Stanka |
| 6,384,365 B1 | 5/2002 | Seth et al. |
| 7,371,049 B2 | 5/2008 | Cunha et al. |
| 7,441,331 B2 | 10/2008 | Hudson et al. |
| 8,231,354 B2 | 7/2012 | Campbell et al. |
| 8,267,663 B2 | 9/2012 | Larose et al. |
| 8,474,137 B2 | 7/2013 | Richter et al. |
| 9,221,101 B2 | 12/2015 | Hugot et al. |
| 9,656,321 B2 | 5/2017 | Cui et al. |
| 9,687,910 B2 | 6/2017 | Bullied et al. |
| 9,700,941 B2 | 7/2017 | James et al. |
| 9,782,862 B2 | 10/2017 | Kamel et al. |
| 9,802,248 B2 | 10/2017 | Marcin, Jr. et al. |
| 9,976,435 B2 | 5/2018 | Borja et al. |
| 10,005,125 B2 | 6/2018 | Shah et al. |
| 10,035,185 B2 | 7/2018 | Shah et al. |
| 10,065,239 B2 | 9/2018 | Marcin, Jr. et al. |
| 10,145,245 B2 | 12/2018 | Roberge et al. |
| 10,239,142 B2 | 3/2019 | Bareiss et al. |
| 10,247,028 B2 | 4/2019 | Blaney et al. |
| 10,287,896 B2 | 5/2019 | Marcin, Jr. et al. |
| 10,316,683 B2 | 6/2019 | Palmer |
| 10,449,605 B2 | 10/2019 | Bullied et al. |
| 10,458,249 B2 | 10/2019 | McCaffrey et al. |
| 10,584,602 B2 | 3/2020 | Bareiss et al. |
| 10,843,271 B2 | 11/2020 | Motin et al. |
| 11,203,064 B2 * | 12/2021 | Ozbaysal .................. B22F 5/04 |
| 2004/0134897 A1 | 7/2004 | Das et al. |
| 2005/0091848 A1 | 5/2005 | Nenov et al. |
| 2007/0141368 A1 | 6/2007 | Farmer et al. |
| 2008/0166225 A1 | 7/2008 | Strangman et al. |
| 2012/0263576 A1 | 10/2012 | Lacy et al. |
| 2013/0205801 A1 | 8/2013 | Xu et al. |
| 2014/0237784 A1 | 8/2014 | Lacy et al. |
| 2014/0263579 A1 | 9/2014 | Kulkarni et al. |
| 2014/0294652 A1 | 10/2014 | Morrison et al. |
| 2015/0147165 A1 | 5/2015 | Bunker |
| 2015/0345296 A1 | 12/2015 | Davidson et al. |
| 2016/0158840 A1 | 6/2016 | Cologna et al. |
| 2016/0186612 A1 | 6/2016 | Anga et al. |
| 2016/0215627 A1 | 7/2016 | Roberge et al. |
| 2017/0333995 A1 | 11/2017 | Ott et al. |
| 2018/0223681 A1 | 8/2018 | Gallier et al. |
| 2019/0039133 A1 | 2/2019 | Cui et al. |
| 2019/0054537 A1 | 2/2019 | Mottin et al. |
| 2019/0076930 A1 | 3/2019 | Mottin et al. |
| 2020/0215640 A1 | 7/2020 | Sheedy et al. |
| 2020/0255345 A1 | 8/2020 | Clark et al. |
| 2021/0254474 A1 | 8/2021 | Farris et al. |
| 2021/0332706 A1 * | 10/2021 | Bales .................... B23K 20/02 |
| 2022/0403742 A1 | 12/2022 | Hazel et al. |
| 2022/0403755 A1 | 12/2022 | Hazel et al. |
| 2023/0147399 A1 | 5/2023 | Farris et al. |
| 2023/0151736 A1 | 5/2023 | Hazel et al. |
| 2023/0151738 A1 | 5/2023 | Lutjen et al. |

FOREIGN PATENT DOCUMENTS

| | | |
|---|---|---|
| EP | 0744529 A1 | 11/1996 |
| EP | 1097779 A1 | 5/2001 |
| EP | 1332824 A2 | 8/2003 |
| EP | 1643081 A2 | 4/2006 |
| EP | 1760265 B1 | 7/2007 |
| EP | 2078579 A1 | 7/2009 |
| EP | 2511482 A2 | 10/2012 |
| EP | 2657451 A2 | 10/2013 |
| EP | 2982471 A1 | 2/2016 |
| EP | 3034810 A1 | 6/2016 |
| EP | 3090139 A2 | 11/2016 |
| EP | 3095971 A1 | 11/2016 |
| EP | 3049627 B1 | 10/2019 |
| EP | 3575016 A1 | 12/2019 |
| EP | 3575424 A1 | 12/2019 |
| EP | 3712122 A1 | 9/2020 |
| EP | 3848555 A1 | 7/2021 |
| EP | 3865664 A1 | 8/2021 |
| FR | 2981590 A1 | 4/2013 |
| WO | 2015023321 A2 | 2/2015 |
| WO | 2015122953 A2 | 8/2015 |
| WO | 2015130355 A2 | 9/2015 |
| WO | 2021023945 A1 | 2/2021 |

OTHER PUBLICATIONS

Lin et al.;"Solid-State Joining of Dissimilar Ni-Based Superalloys via Field-Assisted Sintering Technology for Turbine Applications"; Metallurgical and Materials Transactions A 52.6; Jun. 2021, pp. 2149-2154.

Search Report issued in European Patent Application No. 22179741.8; Application Filing Date Jun. 17, 2022; Date of Mailing Oct. 31, 2022 (8 pages).

Search Report issued in European Patent Application No. 22179744.2; Application Filing Date Jun. 17, 2022; Date of Mailing Oct. 31, 2022 (8 pages).

Search Report issued in European Patent Application No. 22179758.2; Application Filing Date Jun. 17, 2022; Date of Mailing Nov. 3, 2022 (7 pages).

Search Report issued in European Patent Application No. 22179759.0; Application Filing Date Jun. 17, 2022; Date of Mailing Nov. 4, 2022 (9 pages).

Search Report issued in European Patent Application No. 22179733.5; Application Filing Date Jun. 17, 2022; Date of Mailing Nov. 9, 2022 (11 pages).

Search Report issued in European Patent Application No. 22179745.9; Application Filing Date Jun. 17, 2022; Date of Mailing Nov. 9, 2022 (12 pages).

Walston; "Coating and Surface Technologies for Turbine Airfoils"; Superalloys 2004; TMS (The Minerals, Metals & Materials Society); Jan. 2004, pp. 579-588.

Brochure: "International Workshop on Field Assisted Sintering Technology" Jun. 2017, The Pennsylvania State University, University Park, Pennsylvania (2 pages).

Charis Lin, et al.:"Single Crystal Ni Superalloy Joining: Preliminary Results", Updated Nov. 9, 2020; pp. 1-20.

Harris et al.; "MAR M 247 Derivations—CM 247 LC DS Alloy CMSX Single Crystal Alloys Properties & Performance" The Wayback Machine; Superalloys; Jan. 1984, pp. 221-230.

Office Action for EP Application No. 22179745.9; Mail date Oct. 8, 2024 (4 pages).

Office Action for EP Application No. 22179733.5; Mail date Oct. 14, 2024 (6 pages).

\* cited by examiner

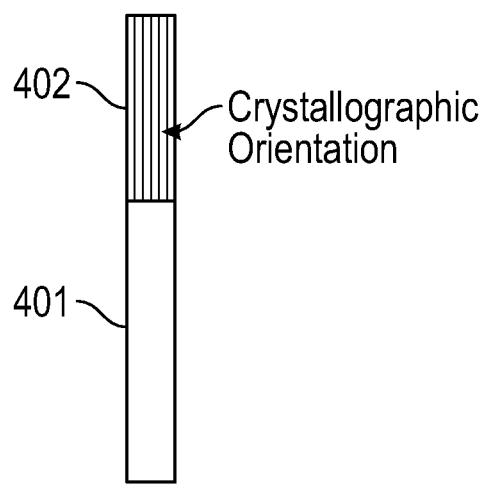
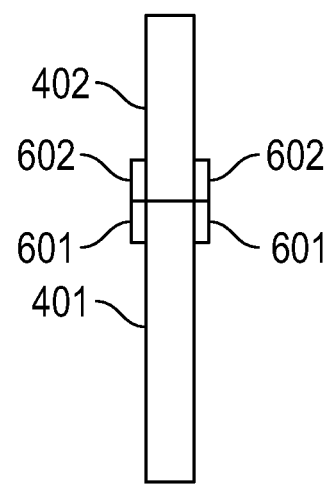
FIG. 5
FIG. 6
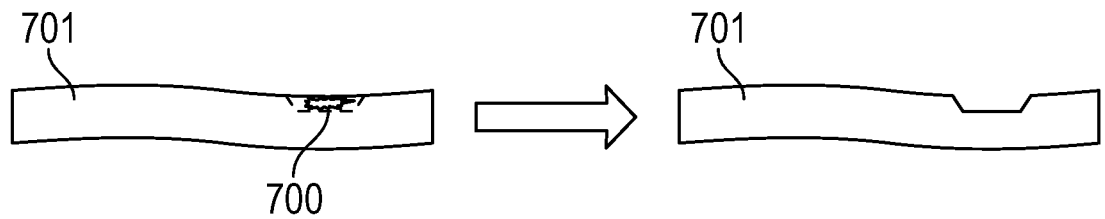
FIG. 7
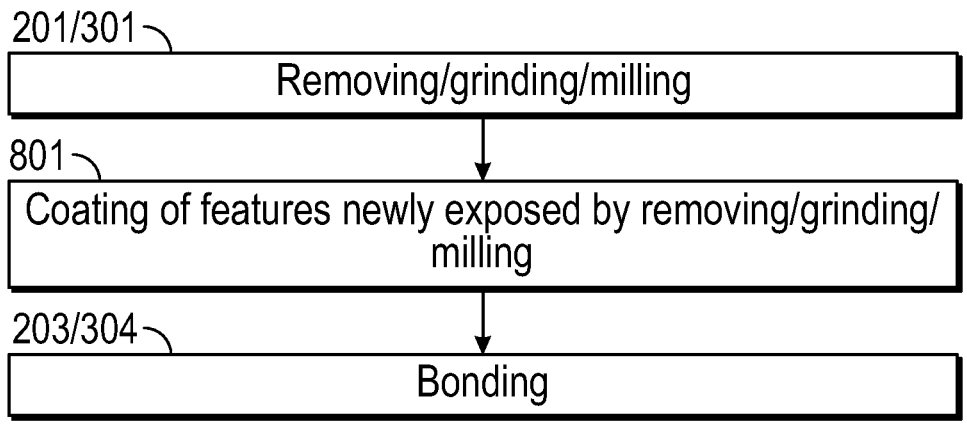
FIG. 8

BONDING METHOD FOR REPAIR OF SUPERALLOY ARTICLE

CROSS-REFERENCE TO RELATED APPLICATIONS

This application claims priority to U.S. Provisional Application No. 63/212,325 filed Jun. 18, 2021, and U.S. Provisional Application No. 63/232,963 filed Aug. 13, 2021, the contents of which are hereby incorporated by reference in their entirety.

BACKGROUND

The present disclosure relates to methods of bonding and, more particularly, to a bonding method for repair of a superalloy article.

Field-run hardware realizes distress at hot locations that limit reuse of the component. Some of this distress is not repairable by current means (e.g., laser cladding) particularly where specific examples of distress include tips of turbine blades and gas path surfaces of blade outer air seals (BOAS).

Current turbine blade tip restoration processes have repair yields that are not 100% effective and some percentage are not deemed repairable at a first shop interval. Repair can include weld or laser clad restoration of the tip with alloys that may be less capable for turbine operations than the original superalloy. Repair yield at the second shop interval can be further reduced due to cracking at the prior repair.

Accordingly, a need exists for a repair method that can recover parts with large damage zones with higher reliability than current repair operations.

BRIEF DESCRIPTION

According to an aspect of the disclosure, a method of repair of a part is provided and includes removing a section that is damaged from the part, casting a replacement section for the part, the replacement section having a geometry similar to that of the section in an undamaged condition and bonding the replacement section to the part using field assisted sintering technology (FAST).

In accordance with additional or alternative embodiments, the part can include a turbine blade of a gas turbine engine and the removing of the section includes grinding a tip of the turbine blade back to a lower span line; the part can include a blade outer air seal (BOAS) of a gas turbine engine and the removing of the section includes grinding along a circumferential plane in from a gas path surface; and/or the part can include a turbine vane or a platform of a gas turbine engine and the removing of the section includes milling.

In accordance with additional or alternative embodiments, the casting of the replacement section includes a single crystal casting of the replacement section.

In accordance with additional or alternative embodiments, following the removing and prior to the bonding, the method further includes coating features of the part which are exposed by the removing.

In accordance with additional or alternative embodiments, the bonding of the replacement section to the part includes preparing a bond surface of the part and a corresponding bond surface of the replacement section by at least one of grinding and cleaning.

In accordance with additional or alternative embodiments, the bonding of the replacement section to the part includes at least one of crystallographic aligning and mechanical aligning of the replacement section with the part.

In accordance with additional or alternative embodiments, the method further includes at least one of coating and finishing the part and the replacement section bonded thereto.

According to an aspect of the disclosure, a method of repair of a turbine blade or a blade outer seal (BOAS) of a gas turbine engine is provided and includes grinding a section that is damaged from the turbine blade or the BOAS, casting a replacement section for the turbine blade or the BOAS, the replacement section having a geometry similar to that of the section in an undamaged condition, preparing a bond surface of the turbine blade or the BOAS and a corresponding bond surface of the replacement section for bonding and bonding the replacement section to the turbine blade or the BOAS using field assisted sintering technology (FAST) at the bond surface of the turbine blade or the BOAS and the corresponding bond surface of the replacement section.

In accordance with additional or alternative embodiments, for the turbine blade, the grinding includes grinding a tip of the turbine blade back to a lower span line, and, for the BOAS, the grinding includes grinding along a circumferential plane in from a gas path surface.

In accordance with additional or alternative embodiments, the casting of the replacement section includes a single crystal casting of the replacement section.

In accordance with additional or alternative embodiments, the preparing of the bond surface of the turbine blade or the BOAS and the corresponding bond surface of the replacement section includes at least one of grinding and cleaning.

In accordance with additional or alternative embodiments, following the grinding and prior to the bonding, the method further includes coating features of the turbine blade or the BOAS which are exposed by the grinding.

In accordance with additional or alternative embodiments, the bonding of the replacement section to the turbine blade or the BOAS includes at least one of crystallographic aligning and mechanical aligning of the replacement section with the turbine blade or the BOAS.

In accordance with additional or alternative embodiments, the method further includes at least one of coating and finishing the turbine blade or the BOAS and the replacement section bonded thereto.

According to an aspect of the disclosure, a method of repair of a turbine vane or platform of a gas turbine engine is provided and includes milling a section that is damaged out of the turbine vane or the platform, casting a replacement section for the turbine vane or the platform, the replacement section having a geometry similar to that of the section in an undamaged condition, preparing a bond surface of the turbine vane or the platform and a corresponding bond surface of the replacement section for bonding and bonding the replacement section to the turbine vane or the platform using field assisted sintering technology (FAST) at the bond surface of the turbine vane or the platform and the corresponding bond surface of the replacement section.

In accordance with additional or alternative embodiments, the casting of the replacement section includes a single crystal casting of the replacement section.

In accordance with additional or alternative embodiments, the preparing of the bond surface of the turbine vane or the platform and the corresponding bond surface of the replacement section includes at least one of grinding and cleaning.

In accordance with additional or alternative embodiments, following the milling and prior to the bonding, the method further includes coating features of the turbine vane or the platform which are exposed by the milling.

In accordance with additional or alternative embodiments, the bonding of the replacement section to the turbine vane or the platform includes at least one of crystallographic aligning and mechanical aligning of the replacement section with the turbine vane or the platform.

In accordance with additional or alternative embodiments, the method further includes at least one of coating and finishing the turbine vane or the platform and the replacement section bonded thereto.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts:

FIG. 5 is a schematic illustration of a crystallographic orientation of a replacement section in accordance with embodiments;

FIG. 6 is a schematic illustration of alignment features of a replacement section in accordance with embodiments;

FIG. 7 is a schematic illustration of a milling of a section of a turbine vane or platform of a gas turbine engine in accordance with embodiments; and FIG. 8 is a flow diagram illustrating a method of repair of a part in accordance with further embodiments.

DETAILED DESCRIPTION

Figure 1:
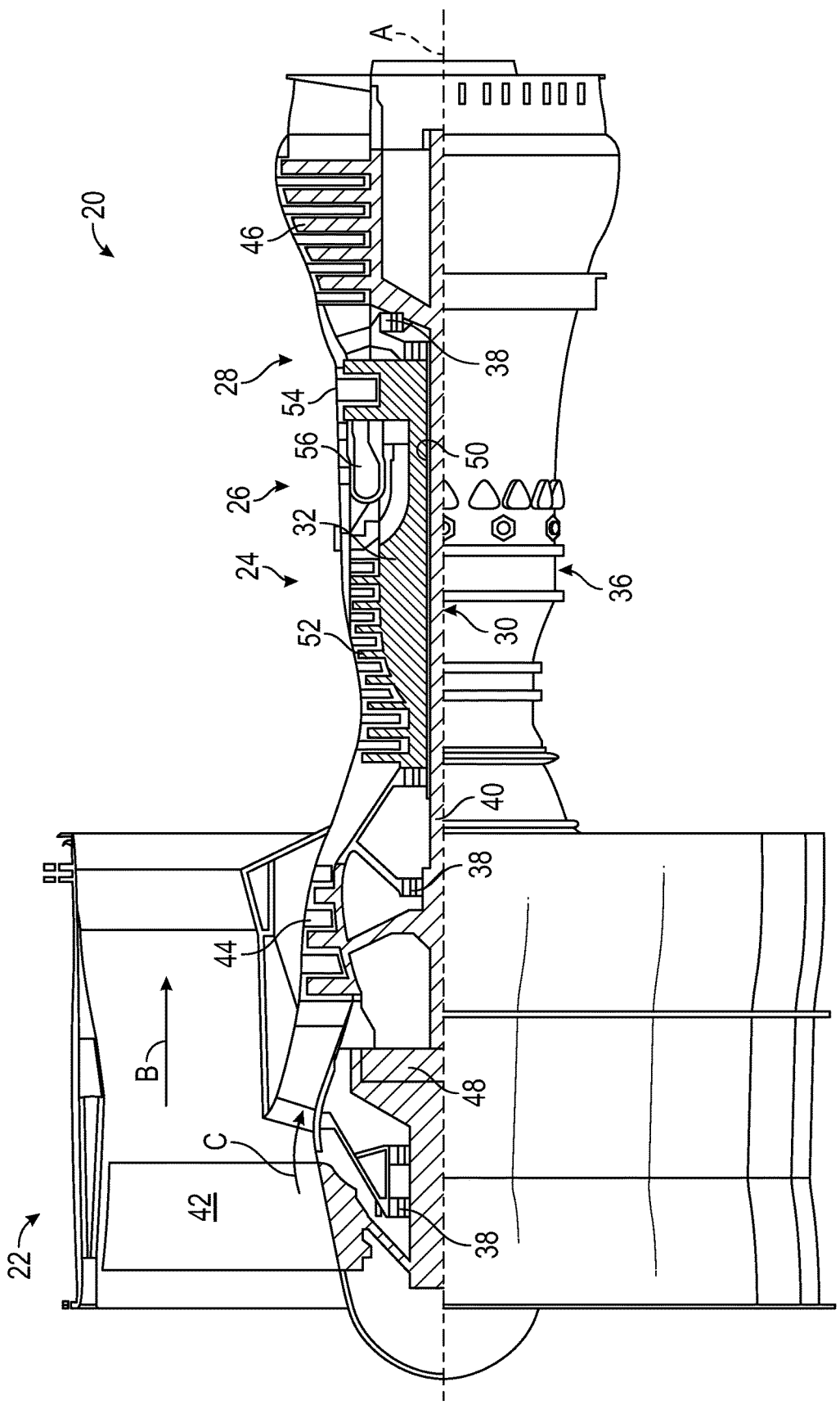
FIG. 1 is a partial cross-sectional view of a gas turbine engine in accordance with embodiments.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram}° \text{R})/(518.7° \text{R})]^{0.5}$. The "Low corrected fan tip speed" as disclosed herein according to one non-limiting embodiment is less than about 1150 ft/second (350.5 m/sec).

Field assisted sintering technology (FAST) and spark plasma sintering (SPS) are consolidation processes that are executed at temperatures lower than the melting point of the subject materials. Similar to hot pressing, FAST forms bonds between materials but at temperatures ~200° C. lower. FAST utilizes a high amperage pulsed direct current (DC) electrical current to heat the subject materials to be bonded through Joule heating while under uniaxial compression. The consolidation is a combination of solid-state transport mechanisms including primarily diffusion and creep. The result is a metallurgical bond between the materials to be joined. Consolidation or joining can be accomplished in a variety of conductive and non-conductive materials and forms.

Recently, FAST/SPS has been gaining acceptance starting in the 1990s for consolidation of powder materials into dense compacts with significantly greater efficiency than hot pressing. Due to the lower processing temperatures of FAST/SPS over other consolidation methods, FAST/SPS mitigates significant grain growth common in other diffusional bonding methods. In some cases, bonding two dense metallic materials using the FAST process has been demonstrated. Material pairs included a same alloy (e.g., PWA 1429) and dissimilar alloys (e.g., PWA 1429 to CM247). Additionally, the ability to bond both single crystal (SX) and equiaxed (EQ) materials and the ability to retain fine features along bond lines have been demonstrated.

As will be described below, an engine component returned from service with distress (e.g., environmental attack or TMF cracking) is removed from its parent component by grinding away the damaged material along a continuous plane. For a turbine blade, this could optionally be to grind back the tip to a lower span line (either above or below the tip shelf). For a BOAS, this could be to grind along a circumferential plane inwardly from the gas path surface. A replacement shape, similar to the geometry of the material removed by grinding, is single crystal cast using investment cast methods. The mating surfaces are ground and cleaned to ensure good contact. The surfaces are bonded using the FAST method. The component is then coated and finished for reuse in service. Alignment features may be included in the newly cast feature for alignment in the FAST process that will be later ground off prior to finishing.

Figure 2:
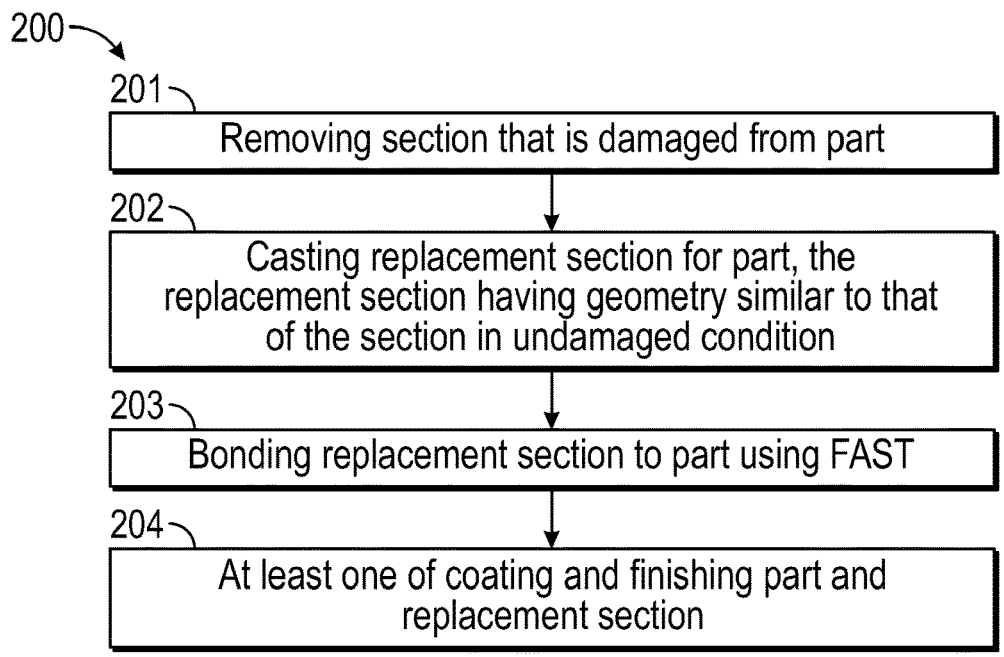
FIG. 2 is a flow diagram illustrating a method of repair of a part in accordance with embodiments.

With reference to FIG. 2, a method 200 of repair of a part, such as a turbine blade, a blade outer seal (BOAS) or a turbine vane or platform of the gas turbine engine 20 of FIG. 1 is provided. As shown in FIG. 2, the method includes removing a section that is damaged from the part (201), casting a replacement section for the part, the replacement section having a geometry similar to that of the section in an undamaged condition (202) and bonding the replacement section to the part using FAST (203). In accordance with embodiments, the method 200 can further include at least one of coating and finishing the part and the replacement section bonded thereto (204).

Where the part includes or is provided as a turbine blade, the removing of the section of operation 201 can include grinding a tip of the turbine blade back to a lower span line and in some cases beyond tip shelf regions and into span regions that expose or open up internal cooling circuit features. Where the part includes or is provided as a BOAS, the removing of the section of operation 201 can include grinding along a circumferential plane in from a gas path surface and again, in some cases, beyond tip shelf regions and into span regions that expose or open up internal cooling circuit features. Where the part includes or is provided as a turbine vane or a platform, the removing of the section of operation 201 can include or be provided as a milling of the section out of the turbine vane or the platform. The casting of the replacement section of operation 202 can include a single crystal casting of the replacement section.

The bonding of the replacement section to the part of operation 203 can include at least one of crystallographic aligning of the replacement section with the part (in which the crystal structure of the replacement section aligns or substantially aligns with the crystal structure of the part) and mechanical aligning of the replacement section with the part (in which internal and external features of the replacement section align or substantially align with corresponding internal and external features of the part). The crystallographic aligning can include using tooling to establish and maintain crystallographic alignment to a predefined angular tolerance (e.g., ~10° or less) between the part and the replacement section. To the extent that the mechanical aligning involves the internal and external features of the replacement section aligning or substantially aligning with the corresponding internal and external features of the part, it is to be understood that at least the external features can be machined or otherwise detailed and finished following bonding. Also, the mechanical aligning can include adding alignment features to the part and the replacement section to aid with alignment. The alignment features can be removed following the bonding operation 203.

The bonding of the replacement section to the part of operation 203 can include preparing a bond surface of the part and a corresponding bond surface of the replacement section by at least one of grinding and cleaning so that the bond surface and the corresponding bond surface can be reliably fit together to form a bond line with little to no defects.

Figure 3:
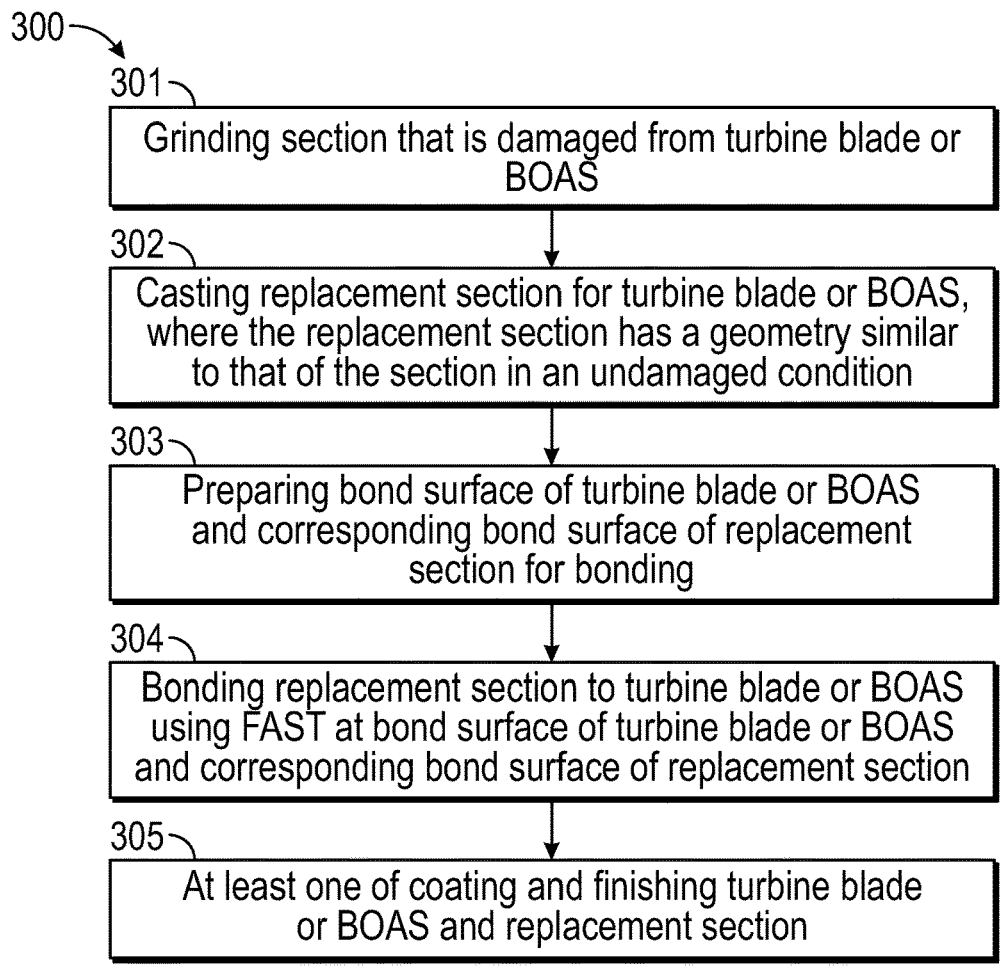
FIG. 3 is a flow diagram illustrating a method of repair of a turbine blade or a blade outer seal (BOAS) of a gas turbine engine in accordance with embodiments.
Figure 4A:
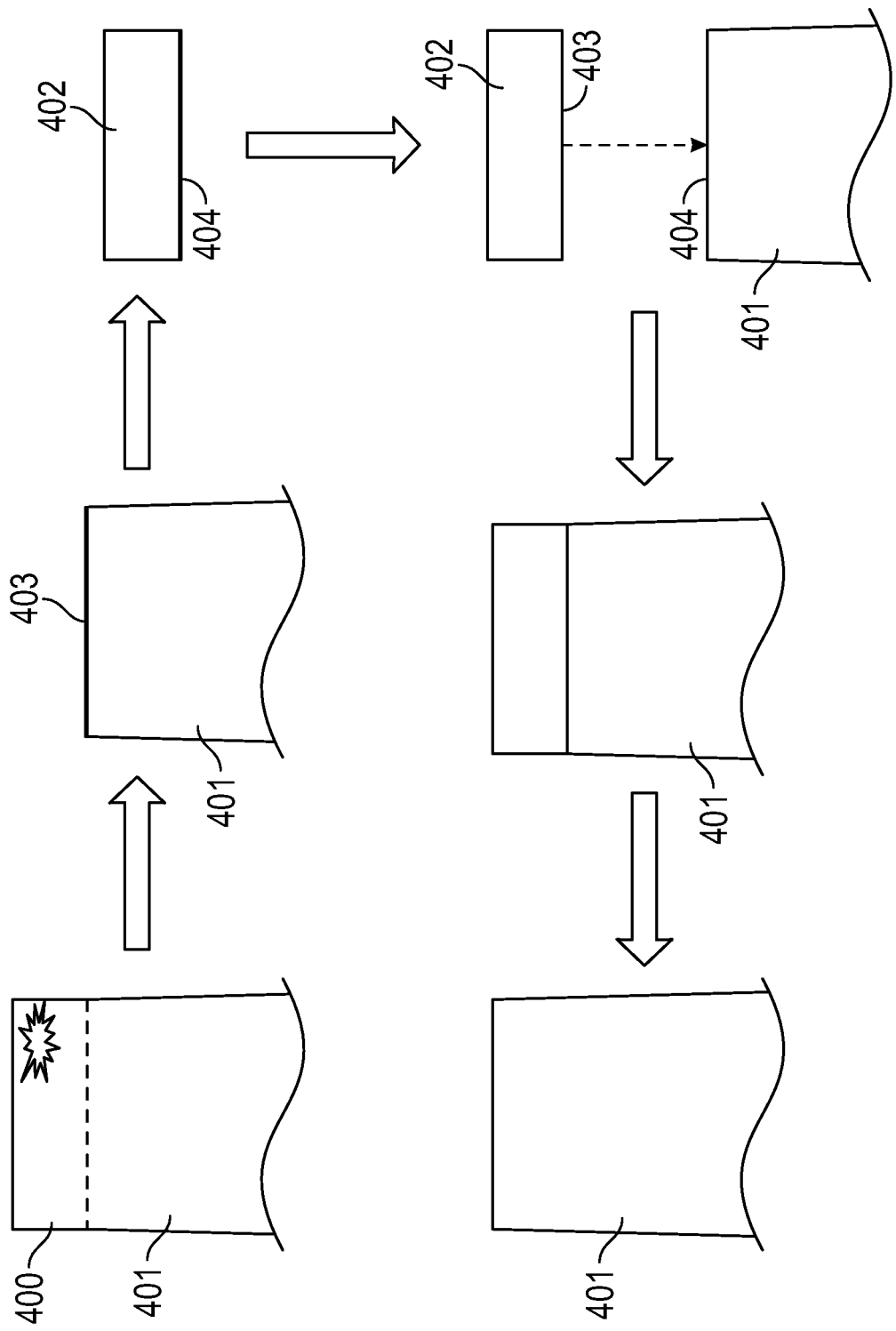
FIG. 4A is a graphical diagram illustrating the method of FIG. 3 in accordance with embodiments.
Figure 4B:
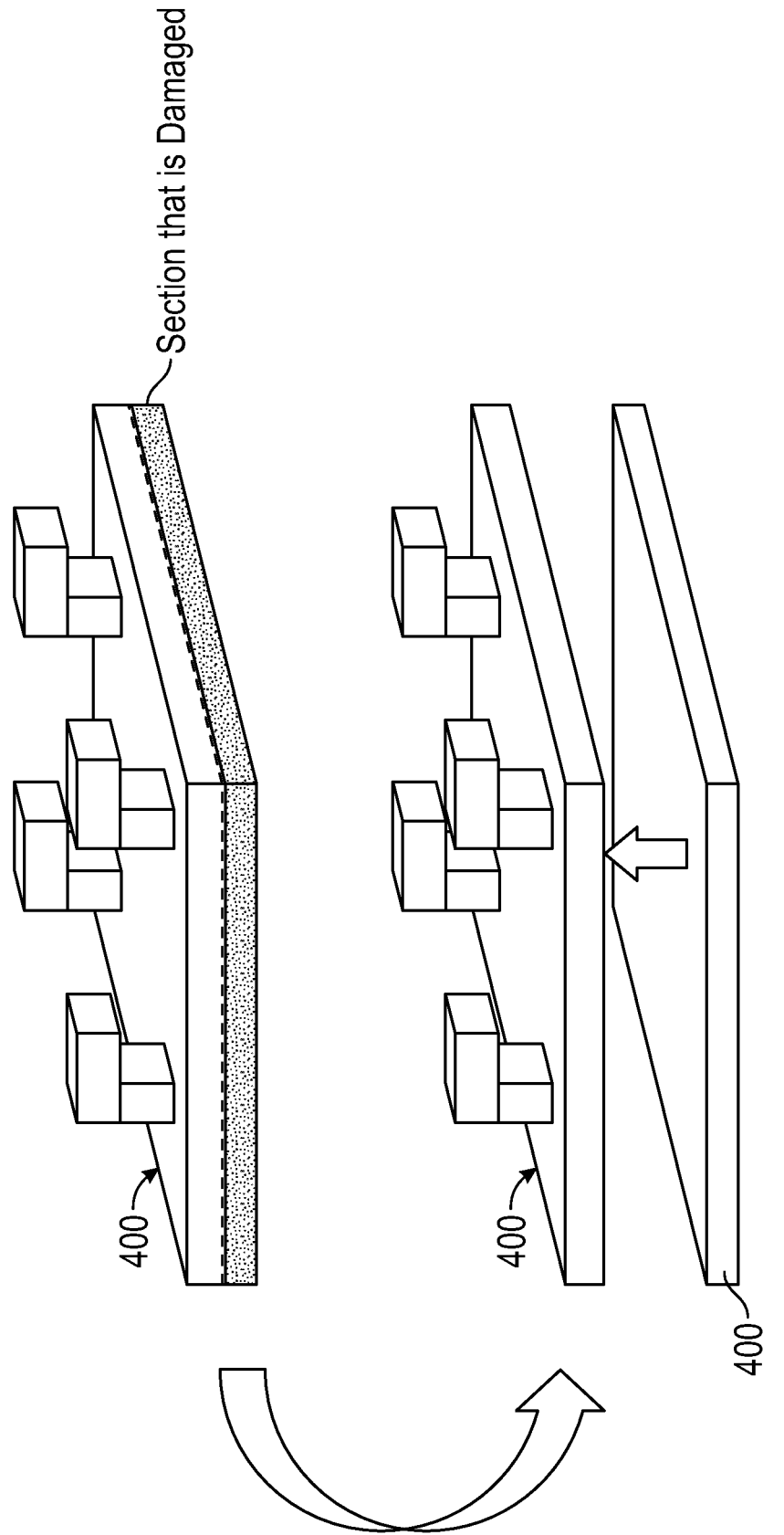
FIG. 4B is a perspective view of removal/bonding operations of FIG. 4A in accordance with embodiments

With reference to FIGS. 3 and 4A and 4B, a method 300 of repair of a turbine blade or a blade outer seal (BOAS) of a gas turbine engine is provided. As shown in FIG. 3, the method 300 includes grinding a section 400 that is damaged from the turbine blade or the BOAS 401 (301). This can be done by either grinding a tip of the turbine blade back to a lower span line in the case of the turbine blade or grinding along a circumferential plane in from a gas path surface in the case of the BOAS as illustrated generally in the illustration of the section 400 being removed from the turbine blade or the BOAS 401 in FIGS. 4A and 4B. The method 300 further includes casting a replacement section 402 for the turbine blade or the BOAS 402 by, e.g., single crystal casting of the replacement section 402, where the replacement section 402 has a geometry similar to that of the section 400 in an undamaged condition (302) and preparing a bond surface 403 of the turbine blade or the BOAS 401 and a corresponding bond surface 404 of the replacement section 402 for bonding by at least one of grinding and cleaning (303). The method further includes bonding the replacement section 402 to the turbine blade or the BOAS 401 using FAST at the bond surface 403 of the turbine blade or the BOAS 401 and the corresponding bond surface 404 of the replacement section 402 (304) and at least one of coating and finishing the turbine blade or the BOAS 401 and the replacement section 402 bonded thereto (305).

With reference to FIGS. 5 and 6, the bonding of the replacement section 402 to the turbine blade or the BOAS 401 of operation 304 can include at least one of crystallographic aligning of the replacement section 402 with the turbine blade or the BOAS 401 (see FIG. 5) and mechanical aligning of the replacement section with turbine blade or the BOAS 401 (see FIG. 6). For the case of the crystallographic aligning, as shown in FIG. 5, the method can include using tooling to establish and maintain a crystallographic alignment between the turbine blade or BOAS 401 and the replacement section 402 to within a predefined angular tolerance (e.g., ~10° or less). For the case of the mechanical aligning, as shown in FIG. 6, the method can include adding alignment features 601 and 602 to the turbine blade or the BOAS 401 and the replacement section 402, respectively, to aid with alignment and removing the alignment features 601 and 602 following the bonding of operation 304. In any case, the crystallographic aligning and the mechanical aligning can include maintaining pressure between the replacement section 402 and the turbine blade or the BOAS 401 in a single direction (i.e., along a single axial plane).

With reference to FIG. 7, a method of repair of a turbine vane or platform of a gas turbine engine is provided and is generally similar to the method 300 described above with reference to FIGS. 3-6 except as described herein. As shown in FIG. 7, the method includes milling a section 700 that is damaged out of the turbine vane or platform 701, casting a replacement section (see above), preparing a bond surface of the turbine vane or platform and a corresponding bond surface of the replacement section (see above) and bonding the replacement section to the turbine vane or platform using FAST at the bond surface and the corresponding bond surface (see above).

In accordance with additional embodiments and with reference back to FIGS. 2, 3 and 7 and additional reference to FIG. 8, the methods described herein can further include a coating or enhancement of a part and a replacement section prior to the bonding of operation 203 of FIG. 2 and the bonding of operation 304 of FIG. 3. For example, turbine blade tip features can be damaged due to hot corrosion and coating processes are limited in effectiveness for protecting internal surfaces of a full cast turbine blade. However, if an internal (or external) feature is newly exposed by the removing of operation 201 of FIG. 2, the grinding of operation 301 of FIG. 3 or the milling operation of FIG. 7, line-of-sight (LOS) processing is possible. In these or other cases, additional or alternative coating processes for those newly exposed internal (or external) features can become available as options (801). These processes could include thermal spraying or physical vapor deposition (PVD) of MCrAlY materials or the like that have superior corrosion resistance as compared with a diffusion aluminide.

In an embodiment, a first alloy for use in the methods described herein may be a "high strength" metal alloy. Examples of the first alloy include PWA 1429, Rene N5, CMSX-4, CMSX-10, TMS-138 or TMS-162. The metal alloys are nickel-based metals that in addition to nickel comprise one or more of chromium, cobalt, molybdenum, aluminum, titanium, tantalum, niobium, ruthenium, rhenium, boron and carbon. The metal alloys contain one or more of the following metals in addition to nickel—2 to 10 wt % of chromium, 2 to 11 wt % of cobalt, 0.5 to 5 wt % molybdenum, 4 to 7.5 wt % of tungsten, 3-7 wt % of aluminum, 0 to 5 wt % of titanium, 3 to 10 wt % of tantalum and 2-8 wt % of rhenium. The metal alloys may also contain ruthenium, carbon and boron.

The composition of these alloys is defined to maximize mechanical properties in a single crystal form while maintaining an adequate level of environmental resistance. Table 1 and Table 2 shows preferred ranges (of the ingredients) for the compositions (in weight percent) that may be used for the first alloy. Table 2 contains broader ranges for some of the alloys (than those indicated in Table 1) that may be used in the first portion.

TABLE 1

Composition of cast superalloys.

| Class | | Alloy | Cr | Co | Mo | W | Al | Ti | Ta | Nb | Re | Ra | Hf | C | B | Zr | Ni |
|---|---|---|---|---|---|---|---|---|---|---|---|---|---|---|---|---|---|
| Conventional | | IN-713LV | 12 | — | 4.5 | — | 5.9 | 0.6 | — | 2 | — | — | — | 0.05 | 0.01 | 0.1 | Bal |
| Cast | | IN-738LC | 16 | 8.5 | 1.75 | 2.6 | 3.4 | 3.4 | 1.75 | 0.9 | — | — | — | 0.11 | 0.01 | 0.04 | Bal |
| (CC) | | René 80 | 14 | 9 | 4 | 4 | 3 | 4.7 | — | — | — | — | 0.8 | 0.16 | 0.015 | 0.01 | Bal |
| | | Mar-M247 | 8 | 10 | 0.6 | 10 | 5.5 | 1 | 3 | — | — | — | 1.5 | 0.15 | 0.015 | 0.03 | Bal |
| DS | 1st | Mar-M200Hf | 8 | 9 | — | 12 | 5 | 1.9 | — | 1 | — | — | 2 | 0.13 | 0.015 | 0.03 | Bal |
| | | CM247LC | 8.1 | 9.2 | 0.5 | 9.5 | 5.6 | 0.7 | 3.2 | — | — | — | 1.4 | 0.07 | 0.015 | 0.007 | Bal |
| | 2nd | CM186LC | 6 | 9.3 | 0.5 | 8.4 | 5.7 | 0.7 | 3.4 | — | 3.0 | — | 1.4 | 0.07 | 0.015 | 0.005 | Bal |
| | | PWA1426 | 6.5 | 10 | 1.7 | 6.5 | 6 | — | 4 | — | 3.0 | — | 1.5 | 0.1 | 0.015 | 0.1 | Bal |
| SC | 1st | CMSX-2 | 5 | 5 | 0.6 | 8 | 5.6 | 1 | 6 | — | — | — | — | — | — | — | Bal |
| | | PWA1480 | 10 | 5 | — | 4 | 5 | 1.5 | 12 | — | — | — | — | — | — | — | Bal |
| | | René N4 | 9 | 8 | 2 | 6 | 3.7 | 4.2 | 4 | 0.5 | — | — | — | — | — | — | Bal |
| | | AM1 | 7 | 8 | 2 | 5 | 5 | 1.8 | 8 | 1 | — | — | — | — | — | — | Bal |
| | | RR2000 | 10 | 15 | 3 | — | 5.5 | 4 | — | — | — | — | — | — | — | — | Bal |
| | 2nd | CMSX-4 | 6.5 | 9.6 | 0.6 | 6.4 | 5.6 | 1 | 6.5 | — | 3 | — | 0.1 | — | — | — | Bal |
| | | PWA1484 | 5 | 10 | 2 | 6 | 5.6 | — | 9 | — | 3 | — | 0.1 | — | — | — | Bal |
| | | René N5 | 7 | 8 | 2 | 5 | 6.2 | — | 7 | — | 3 | — | 0.2 | — | — | — | Bal |
| | 3rd | CMSX-10 | 2 | 3 | 0.4 | 5 | 5.7 | 0.2 | 8 | — | 6 | — | 0.03 | — | — | — | Bal |
| | 4th | TMS-138 | 2.9 | 5.9 | 2.9 | 5.9 | 5.9 | — | 5.6 | — | 4.9 | 2 | 0.1 | — | — | — | Bal |
| | 5th | TMS-162 | 2.9 | 5.8 | 3.9 | 5.8 | 5.8 | — | 5.6 | — | 4.9 | 6 | 0.09 | — | — | — | Bal |
| | Re-free | CMSX-7 | 6 | 10 | 0.6 | 9 | 5.7 | 0.8 | 9 | — | — | — | 0.2 | — | — | — | Bal |
| | Low Re | CMSX-8 | 5.4 | 10 | 0.6 | 8 | 5.7 | 0.7 | 8 | — | 1.5 | — | 0.1 | — | — | — | Bal |

TABLE 2

|  | Cr | Co | Mo | W | Al | Ti | Ta | Nb | Re | Ni |
|---|---|---|---|---|---|---|---|---|---|---|
| PWA1429 | 5-7 | 9-11 | 1.5-2.5 | 5.5-7.5 | 5-7 | — | 3-10 | — | 2-4 | Balance |
| René N5 | 6-10 | 7-9 | 1.5-2.5 | 4-7 | 3-7 | 0-5 | 3-8 | 0-1 | 0-4 | Balance |
| CMSX-4 | 4-8 | 7-10 | 0.5-1.5 | 5.5-7.5 | 5-6 | 0-2 | 5-8 | — | 2-4 | balance |
| CMSX-10 | 1-3 | 2-4 | 0.1-1 | 4-6 | 5-7 | 0.1-0.4 | 6-10 | | 4-8 | balance |
| TMS-138 | 2-4 | 3.5-6.5 | 2-4 | 5-7 | 5-7 | — | 5-7 | | 4-6 | balance |
| TMS-162 | 2-4 | 3.5-6.5 | 3-5 | 5-7 | 5-7 | — | 5-7 | | 5-7 | balance |

The high strength alloys can withstand stresses of greater than 800 MPa at temperatures greater than 600° C. and stresses of greater than 200 MPa at temperatures of greater than 800° C.

Second alloys for use in the methods described herein are selected for their ability to handle harsh environmental conditions and can include René 195 and René N2. These compositions were developed with an eye to improved environmental resistance. This can be seen in the Al and Cr levels as compared with Re, W, Mo shown in the Table 3. The cobalt to chromium ratios are lower for the second alloys, while the aluminum to cobalt ratio is much higher for the second alloys when compared with the first alloys.

The second alloys can be a nickel-based alloy that in addition to nickel includes one or more of chromium, cobalt, molybdenum, aluminum, titanium, tantalum, niobium, ruthenium, rhenium, boron and carbon. The metal alloys contain one or more of the following metals in addition to nickel—7 to 14 wt % of chromium, 3 to 9 wt % of cobalt, 0.1 to 0.2 wt % molybdenum, 3 to 5 wt % of tungsten, 6-9 wt % of aluminum, 0 to 5 wt % of titanium, 4 to 6 wt % of tantalum, 0.1 to 0.2 wt % f hafnium and 1-2 wt % of rhenium. The metal alloys may also contain ruthenium, carbon and boron.

TABLE 3

|  | Cr | Co | Al | Ta | Mo | W | Re | Hf | Ni |
|---|---|---|---|---|---|---|---|---|---|
| René 195 | 7-9 | 3-4 | 7-9 | 5-6 | 0.1-0.2 | 3-5 | 1-2 | 0.1-0.2 | balance |
| René N2 | 12-14 | 7-9 | 6-8 | 4-6 | | 3-4 | 1-2 | 0.1-0.2 | balance |

The high strength alloys used in the second alloys can withstand stresses of at least 50% of the first alloys. In an embodiment, the high strength alloys used in the second alloys are environmentally resistant and withstand temperatures of greater than 1200° C. (under oxidation conditions) while undergoing less than 0.05 grams of weight loss per unit weight.

Technical effects and benefits of the present disclosure are the provision of restoration of damaged components with substrate-capable materials as opposed to equiaxed, welded materials as well as a capability for repairs to relatively large damage areas. FAST-bonded restoration processes will yield a relatively high-performing repair feature which will likely increase 2nd time shop yields. Additionally, FAST-bonded restorations may enable repair of components that would otherwise have been scrapped due to the size of the damage zones.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A method of repair of a part, the method comprising:
   removing a section that is damaged from the part;
   casting a replacement section for the part, the replacement section having a geometry similar to that of the section in an undamaged condition; and
   bonding the replacement section to the part using field assisted sintering technology (FAST),
   wherein the bonding of the replacement section to the part comprises at least mechanical aligning of the replacement section with the part and the mechanical aligning comprises:
   adding alignment features to respective opposite sides of the part and the replacement section; and
   removing the alignment features from the respective opposite sides of the part and the replacement section following the bonding.

2. The method according to claim 1, wherein at least one of:
   the part comprises a turbine blade of a gas turbine engine and the removing of the section comprises grinding a tip of the turbine blade back to a lower span line,
   the part comprises a blade outer air seal (BOAS) of a gas turbine engine and the removing of the section comprises grinding along a circumferential plane in from a gas path surface, and
   the part comprises a turbine vane or a platform of a gas turbine engine and the removing of the section comprises milling.

3. The method according to claim 1, wherein the casting of the replacement section comprises a single crystal casting of the replacement section.

4. The method according to claim 1, wherein, following the removing and prior to the bonding, the method further comprises coating features of the part which are exposed by the removing.

5. The method according to claim 1, wherein the bonding of the replacement section to the part comprises preparing a bond surface of the part and a corresponding bond surface of the replacement section by at least one of grinding and cleaning.

6. The method according to claim 1, further comprising at least one of coating and finishing the part and the replacement section bonded thereto.

7. A method of repair of a turbine blade or a blade outer air seal (BOAS) of a gas turbine engine, the method comprising:
grinding a section that is damaged from the turbine blade or the BOAS;
casting a replacement section for the turbine blade or the BOAS, the replacement section having a geometry similar to that of the section in an undamaged condition;
preparing a bond surface of the turbine blade or the BOAS and a corresponding bond surface of the replacement section for bonding; and
bonding the replacement section to the turbine blade or the BOAS using field assisted sintering technology (FAST) at the bond surface of the turbine blade or the BOAS and the corresponding bond surface of the replacement section,
wherein the bonding of the replacement section to the turbine blade or the BOAS comprises at least mechanical aligning of the replacement section with the turbine blade or the BOAS and the mechanical aligning comprises:
adding alignment features to respective opposite sides of the turbine blade or the BOAS and the replacement section; and
removing the alignment features from the respective opposite sides of the turbine blade or the BOAS and the replacement section following the bonding.

8. The method according to claim 7, wherein:
for the turbine blade, the grinding comprises grinding a tip of the turbine blade back to a lower span line, and for the BOAS, the grinding comprises grinding along a circumferential plane in from a gas path surface.

9. The method according to claim 7, wherein the casting of the replacement section comprises a single crystal casting of the replacement section.

10. The method according to claim 7, wherein the preparing of the bond surface of the turbine blade or the BOAS and the corresponding bond surface of the replacement section comprises at least one of grinding and cleaning.

11. The method according to claim 7, wherein, following the grinding and prior to the bonding, the method further comprises coating features of the turbine blade or the BOAS which are exposed by the grinding.

12. The method according to claim 7, further comprising at least one of coating and finishing the turbine blade or the BOAS and the replacement section bonded thereto.

* * * * *